… …

United States Patent Office 3,053,679
Patented Sept. 11, 1962

3,053,679
CELLULOSE ESTERS PLASTICIZED WITH ESTERS OF 2,2,4,4-TETRAALKYLCYCLOBUTANE-1,3-DIOLS
James C. Martin and Kent C. Brannock, Kingsport, Tenn., assignors to Eastman Kodak Company, Rochester, N.Y., a corporation of New Jersey
No Drawing. Filed Mar. 30, 1960, Ser. No. 18,497
8 Claims. (Cl. 106—180)

This invention relates to cellulose ester resins, and more particularly, to a new plasticizer for cellulose esters.

It is an object of this invention to provide new cellulose ester compositions.

It is likewise an object of this invention to provide cellulose acetate butyrate plasticized with a novel group of ester plasticizers.

It is another object of this invention to provide new ester plasticizers for cellulose esters having low volatility, resistance to water leaching and hydrolysis, and compatibility with cellulose ester resins.

These and other objects of the invention are accomplished by means of this invention as described more fully hereinafter with reference to preferred embodiments thereof.

The novel class of plasticizer compounds embodying the invention are diesters of 2,2,4,4-tetraalkylcyclobutane-1,3-diol having the following structural formula:

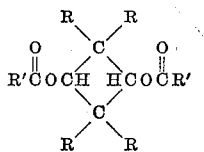

wherein R is an alkyl radical having 1 to 4 carbon atoms and R' is an alkyl radical having 1 to 12 carbon atoms and preferably 1 to 9 carbon atoms. The R' substituent can be either straight or branched chain alkyl groups. Typical esters of the invention include such compounds as 2,2,4,4-tetramethylcyclobutane-1,3-diol diacetate
2,2-dimethyl-4,4-diethylcyclobutane-1,3-diol diisobutyrate
2,2,4,4-tetraethylcyclobutane-1,3-diol di-n-hexanoate
2,2,4,4-tetramethylcyclobutane-1,3-diol dibenzoate
2,2,4,4-tetramethylcyclobutane-1,3-diol di-n-heptanoate
2,2,4,4-tetramethylcyclobutane-1,3-diol bis(2-ethyl hexanoate)
2,2,4,4-tetra-isopropylcyclobutane-1,3-diol di-n-butyrate
2,2,4,4-tetramethylcyclobutane-1,3-diol dipelargonate
2,2,4,4-tetra-n-butylcyclobutane-1,3-diol dipelargonate
2,2,4,4-tetramethylcyclobutane-1,3-diol mono-n-hexanoate monopelargonate
2,4-dimethyl-2,4-diethylcyclobutane-1,3-diol dipelargonate
2,2-dimethyl-4,4-diethylcyclobutane-1,3-diol bis(2-methyl-n-octanoate)
2,2,4,4-tetraethylcyclobutane-1,3-diol dipelargonate
2,2,4,4-tetramethylcyclobutane-1,3-diol di-n-decanoate
2,2,4,4-tetramethylcyclobutane-1,3-diol di-n-undecanoate
2,2,4,4-tetramethylcyclobutane-1,3-diol di-n-dodecanoate
2,2,4,4-tetramethylcyclobutane-1,3-diol di-n-tridecanoate
2,2,4,4-tetramethylcyclobutane-1,3-diol butyrate dodecanoate The esters of the present invention can be prepared by esterifying one molar proportion of a 2,2,4,4-tetraalkylcyclobutane-1,3-diol with two molar proportions of a suitable monocarboxylic acid. A single monocarboxylic acid or mixtures of more than one monocarboxylic acid can be used to esterify the subject diols. This esterification reaction can be effected at a temperature of about 175° to 250° C. At such reaction temperatures the esterification can be effected in the absence of an esterification catalyst. However, lower reaction temperatures can be employed with catalytic amounts of such esterification catalysts as zinc chloride, sulfuric acid and hydrochloric acid. Other well-known esterification methods can also be employed including the use of a carboxylic acid chloride or anhydride in lieu of a carboxylic acid reactant. The preparation of diesters of 2,2,4,4-tetraalkylcyclobutane-1,3-diols is described in our application titled "Esters of 2,2,4,4-Teteraalkylcyclobutane-1,3-Diols," filed concurrently herewith.

The subject esters have utility as plasticizers for the well-known solid cellulose esters. Solid cellulose esters of saturated fatty acids having 2 to 4 carbon atoms such as cellulose acetate butyrate, cellulose acetate propionate and the like are plasticized in accordance with the invention. The subject plasticizers have particular utility as plasticizers for cellulose acetate butyrate esters which typically have 5% to 20% acetyl content and 25% to 50% butyryl content.

It is common practice in the art to modify the properties of such cellulose esters by the addition of various materials having a plasticizing or softening action. It is a requisite of good plasticizing materials that they have such properties as low volatility, water resistance and compatibility with the cellulose ester being plasticized. Low boiling plasitcizers evaporate slowly on standing at room temperautre or at temperatures to which the cellulose ester is subjected to, either in preparation or in use. As a result, films or molded articles thereof become brittle and may easily crack or break. Also, cellulose esters may be subjected to water in their use. If the plasticizer is water soluble to even a small extent, the plasticizer is ultimately leached out. If the plasticizer is not compatible in the proportions generally utilized in cellulose esters, the plasticizer either cannot be effectively incorporated therein or it will exude from films and molded articles thereof to give an oily feel to these articles. Here again, loss of the plasticizer material from the resin results in a reversion to the cellulose ester's original hardness and brittleness.

The esters of the invention have low volatility, are insoluble in water and are compatible with cellulose esters, and hence, are effective plasticizer materials for cellulose esters.

The ester plasticizers of the invention also have high thermal and hydrolytic stability which make these materials desirable plasticizers for cellulose esters. When the esters of the invention are incorporated into cellulose esters as plasticizers they do not break down under the same thermal conditions that cause some plasticizers to be degraded. In the commercial molding of cellulose esters, some waste or scraps are obtained which cannot be remelted and molded again if degradation of the plasticizer has occurred. Hence, the thermally stable esters of the invention have considerable utility as plasticizers.

The esters of the invention are used in cellulose esters in plasticizing amounts, usually at concentrations of about 5% to 40%, with concentrations of about 5% to 30% being preferably used. The aforementioned concentrations are based on the combined weight of the cellulose ester and the plasticizer.

The esters of the invention can be incorporated into cellulose esters as plasticizers therefor by conventional methods. A preferred method of incorporation is blending by milling on heated rolls.

As used herein, the term "2,2,4,4-tetraalkylcyclobutane-1,3-diol" is equivalent to the terms "2,2,4,4-tetraalkyl-1,3-cyclobutanediol" and "2,2,4,4-tetraalkylcyclobutane-diol-1,3."

The present invention is illustrated by the following examples of preferred embodiments thereof.

EXAMPLE 1

Eighty parts by weight of cellulose acetate butyrate (about 13% acetyl content and about 37% butyryl content) and 20 parts by weight of 2,2,4,4-tetramethylcyclobutane-1,3-diol bis(2-ethyl hexanoate) were substantially uniformly mixed on heated rolls, extruded into sheets about 0.006 inch in thickness, and then granulated. The granulated product was then molded on an injection press into various molded objects. These molded articles had high impact strength, good resistance to thermal degradation, and low hydrolytic breakdown as measured by molecular weight lowering during prolonged exposure to hot water. The plasticizer in the cellulose acetate butyrate showed high resistance to extraction by water. Eighty parts by weight of the cellulose acetate butyrate is similarly plasticized with 20 parts by weight of 2,2,4,4-tetraethylcyclobutane-1,3-diol dipelargonate. While the 2,2,4,4-tetramethylcyclobutane-1,3-diol bis(2-ethyl hexanoate) plasticizer was compatible with and could be readily incorporated in the cellulose acetate butyrate, this plasticizer was found not to be compatible with a polyvinyl chloride resin ("Geon 101," B. F. Goodrich Company) and could not be incorporated therein in the usual plasticizing amounts. When the subject plasticizers are incorporated into cellulose esters as plasticizers they do not break down under the same thermal conditions that cause some plasticizers to be degraded. In the commercial molding of cellulose esters, some waste or scrapes are obtained which cannot be remelted and molded again if degradation of the plasticizer has occurred.

EXAMPLE 2

A sample of cellulose acetate butyrate (about 13% acetyl content and about 37% butyryl content) plasticized with 20% by weight of 2,2,4,4-tetramethylcyclobutane-1,3-diol bis(2-ethyl hexanoate) as described in Example 1 was compared with a sample of the cellulose acetate butyrate plasticized with 20% by weight of di-n-butyl sebacate. Both samples were exposed to 100% relative humidity at 110° C. for 15 days. The results of the exposure test are summarized by the data in Table A below in terms of change of inherent viscosities of the respective samples.

Table A

| Plasticizer | Inherent Viscosity, Before Exposure | Inherent Viscosity, After Exposure |
| --- | --- | --- |
| (a) 2,2,4,4 - Tetramethylcyclobutane-1,3 - diol bis(2-ethyl hexanoate) | 1.51 | 1.24 |
| (b) Di-n-butyl sebacate | 1.49 | <0.05 |

EXAMPLE 3

A series of samples of cellulose acetate butyrate (about 13% acetyl content and about 37% butyryl content) having varying amounts of 2,2,4,4-tetramethylcyclobutane-1,3-diol bis(2-ethyl hexanoate) incorporated therein as a plasticizer were subjected to several conventional tests to determine the physical properties thereof. The results of the various tests are summarized by the data set out in Table B below. The amount of plasticizer is indicated in Table B as percent by weight based on the total weight of the plasticizer and the cellulose acetate butyrate.

Table B

AMOUNT OF 2,2,4,4-TETRAMETHYLCYCLOBUTANE-1,3-DIOL BIS(2-ETHYL HEXANOATE) PLASTICIZER

| Property | 8.5% | 25% |
| --- | --- | --- |
| Rockwell hardness at 72° F | 15X-77 | 15X-40.5 |
| Distortion under heat, 66 p.s.i. ° F | 121-134 | 101-108 |
| Izod impact strength, -40° F | .78 | 1.08 |
| Izod impact strength, 72° F | .78 | 2.1 |
| Tensile strength (facture), 72° F | 5,270 | 4,380 |
| Elongation at 72° F | 10 | 60 |
| Modulus of elasticity, p.s.i. × $10^5$ | 2.0 | 1.33 |
| Stiffness p.s.i. w $10^3$ | 1.07 | .82 |
| Tensile strength (upper yield) 72° F | 6,120 | 3,820 |
| Volatility (weight loss in percent after 24 hr. at 110° C.) | 1.06 | 1.35 |
| Volatility (weight loss in percent after 48 hr. at 110° C.) | 1.14 | 1.62 |

EXAMPLE 4

A series of samples of cellulose acetate butyrate (about 13% acetyl content and about 37% butyryl content) having varying amounts of the diisobutyrate, the di-n-butyrate and the diacetate esters of 2,2,4,4-tetramethylcyclobutane-1,3-diol incorporated therein as plasticizers were subjected to several conventional tests to determine the physical properties thereof. The results of the various tests are summarized by the data set out in Table C below. The amount of plasticizer is indicated in Table C as percent by weight based on the total weight of the plasticizer and the cellulose acetate butyrate.

Table C

AMOUNT OF 2,2,4,4-TETRAMETHYLCYCLOBUTANE-1,3 DIOL DIESTER PLASTICIZER

| Property | Diisobutyrate | | Di-n-butyrate | | Diacetate | |
| --- | --- | --- | --- | --- | --- | --- |
|  | 15— | 25— | 15— | 25— | 15— | 25— |
| Elongation percent, 72° F. | 40 | 60 | 60 | 70 | 50 | 60 |
| Izod impact strength (72° F.) | 1.9 | 4.0 | 3.3 | 4.0 | 3.1 | 3.1 |
| Tensile strength (p.s.i., at fracture, 72° F., 50% R.H.) | 5,360 | 4,760 | 5,938 | 4,670 | 6,030 | 4,950 |
| Modulus of elasticity (p.s.i.×$10^5$) | 1.7 | 1.2 | 1.27 | 1.07 | 1.44 | 1.17 |
| Volatility (weight loss in percent after 24 hr. at 110° C.) | .24 | .75 | .29 | 1.0 | .20 | .68 |
| Water absorption (percent, 24 hr. immersion in water) | 1.55 | 1.40 | 1.51 | 1.38 | 1.62 | 1.47 |
| Material leached out (percent, 24 hr. immersion in water) | .51 | .43 | .32 | .35 | .38 | .34 |
| Exudation (24 hr. at 144° F. and 88% R.H.) |  |  | none | none | none | none |

Thus, the present invention provides new plastic compositions comprising cellulose esters plasticized with new ester materials particularly adapted for this purpose.

Although the invention has been described in considerable detail with reference to certain preferred embodiments thereof, it will be understood that variations and modifications can be effected within the spirit and scope of the invention as described hereinabove and as defined by the appended claims.

This application is a continuation-in-part of our copending application titled "Esters of 2,2,4,4-Tetraalkyl-cyclobutane-1,3-Diols," U.S. Serial No. 805,731, filed April 13, 1959, now abandoned.

We claim:

1. A plastic composition comprising predominantly a cellulose ester of a saturated fatty acid having 2 to 4 carbon atoms and a plasticizing amount of a plasticizer having the formula:

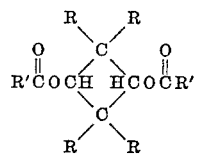

wherein R is a lower alkyl radical having 1 to 4 carbon atoms, and wherein R' is an alkyl radical having 1 to 12 carbon atoms, said plasticizing amount being 5 to 40% by weight based on the combined weights of said cellulose ester and said plasticizer.

2. A plastic composition comprising predominantly a cellulose acetate butyrate and a plasticizer having the formula:

wherein R is an alkyl radical having 1 to 2 carbon atoms, and wherein R' is an alkyl radical having 1 to 9 carbon atoms, said plasticizer being present in amounts of 5 to 30% by weight based on the combined weights of said cellulose acetate butyrate and said plasticizer.

3. A plastic composition comprising predominantly a cellulose acetate butyrate and a plasticizer having the formula:

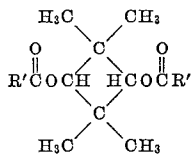

wherein R' is an alkyl radical having 1 to 9 carbon atoms, said plasticizer being present in amounts of 5 to 30% by weight based on the combined weights of said cellulose acetate butyrate and said plasticizer.

4. A plastic composition comprising predominantly cellulose acetate butyrate having 5 to 20% acetyl content and 25 to 50% butyryl content plasticized with 2,2,4,4-tetramethylcyclobutane-1,3-diol bis(2-ethyl hexanoate), the said plasticizer being present in amounts of 5 to 30% by weight based on the combined weights of said cellulose acetate butyrate and the said plasticizer.

5. A plastic composition comprising predominantly cellulose acetate butyrate having 5 to 20% acetyl content and 25 to 50% butyryl content plasticized with 2,2,4,4-tetraethylcyclobutane-1,3-diol dipelargonate, the said plasticizer being present in amounts of 5 to 30% by weight based on the combined weights of said cellulose acetate butyrate and the said plasticizer.

6. A plastic composition comprising predominantly cellulose acetate butyrate having 5 to 20% acetyl content and 25 to 50% butyryl content plasticized with 2,2,4,4-tetramethylcyclobutane-1,3-diol di-n-butyrate, the said plasticizer being present in amounts of 5 to 30% by weight based on the combined weights of said cellulose acetate butyrate and the said plasticizer.

7. A plastic composition comprising predominantly cellulose acetate butyrate having 5 to 20% acetyl content and 25 to 50% butyryl content plasticized with 2,2,4,4-tetramethylcyclobutane-1,3-diol diacetate, the said plasticizer being present in amounts of 5 to 30% by weight based on the combined weights of said cellulose acetate butyrate and the said plasticizer.

8. A plastic composition comprising predominantly cellulose acetate butyrate having 5 to 20% acetyl content and 25 to 50% butyryl content plasticized with 2,2,4,4-tetramethylcyclobutane-1,3-diol di-isobutyrate, the said plasticizer being present in amounts of 5 to 30% by weight based on the combined weights of said cellulose acetate butyrate and the said plasticizer.

References Cited in the file of this patent
UNITED STATES PATENTS

| | | |
|---|---|---|
| 2,186,454 | Gloor | Jan. 9, 1940 |
| 2,512,722 | Lanham | June 27, 1950 |
| 2,576,268 | Shugar et al. | Nov. 27, 1951 |
| 2,628,249 | Brune | Feb. 10, 1953 |
| 2,689,799 | Albus et al. | Sept. 21, 1954 |
| 2,936,324 | Hasek et al. | May 10, 1960 |